US012700252B2

(12) United States Patent (10) Patent No.: US 12,700,252 B2

Matsumoto et al. (45) **Date of Patent: \*Aug. 4, 2026**

(54) CHARACTER RECOGNITION DEVICE AND CHARACTER RECOGNITION METHOD

(71) Applicant: Panasonic Intellectual Property Management Co., Ltd., Osaka (JP)

(72) Inventors: Kentaro Matsumoto, Osaka (JP); Yuma Saito, Nara (JP); Daiki Yamamoto, Kanagawa (JP); Rei Hasegawa, Osaka (JP); Masashi Yamamoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 237 days.

This patent is subject to a terminal disclaimer.

(21) Appl. No.: 18/665,063

(22) Filed: May 15, 2024

(65) Prior Publication Data

US 2024/0296686 A1 Sep. 5, 2024

Related U.S. Application Data

(63) Continuation of application No. 18/511,203, filed on Nov. 16, 2023, now Pat. No. 12,033,410.

(30) Foreign Application Priority Data

Nov. 21, 2022 (JP) ................................. 2022-186039

(51) Int. Cl.
  *G06K 9/00* (2022.01)
  *G06V 20/62* (2022.01)
  *G06V 30/148* (2022.01)

(52) U.S. Cl.
  CPC .......... *G06V 30/153* (2022.01); *G06V 20/625* (2022.01)

(58) Field of Classification Search
  CPC .......................... G06V 30/153; G06V 20/625
  See application file for complete search history.

(56) References Cited

U.S. PATENT DOCUMENTS

| | | | |
|---|---|---|---|
| 11,562,583 B1 * | 1/2023 | Zaidi ...................... | G06V 20/64 |
| 12,033,410 B2 * | 7/2024 | Matsumoto ............ | G06V 20/63 |
| 2008/0212837 A1 | 9/2008 | Matsumoto et al. | |

(Continued)

FOREIGN PATENT DOCUMENTS

| | | |
|---|---|---|
| JP | 2008-217347 | 9/2008 |
| JP | 6549684 | 7/2019 |

OTHER PUBLICATIONS

International Search Report (ISR) from International Searching Authority in International Pat. Appl. No. PCT/JP2023/041889, dated Feb. 14, 2024.

(Continued)

*Primary Examiner* — David F Dunphy

(74) *Attorney, Agent, or Firm* — Greenblum & Bernstein, P.L.C.

(57) ABSTRACT

A character recognition device includes a recognizer that recognizes at least one character string from an image including a trailer captured by an imaging device, an attribute determinator that determines an attribute of the character string recognized by the recognition unit, and a trailer ID estimator that estimate whether the character string is a trailer ID based on the attribute of the character string determined by the attribute determinator.

9 Claims, 5 Drawing Sheets

(56)                    References Cited

U.S. PATENT DOCUMENTS

| | | |
|---|---|---|
| 2018/0173988 A1 | 6/2018 | Sharma et al. |
| 2022/0084186 A1 | 3/2022 | Ivens et al. |
| 2023/0021506 A1 | 1/2023 | Ramaswamy Srinivasa et al. |
| 2023/0025548 A1 | 1/2023 | Ramaswamy Srinivasa et al. |

OTHER PUBLICATIONS

Written Opinion (WO) from International Searching Authority in International Pat. Appl. No. PCT/JP2023/041889, dated Oct. 16, 2024.
Zhang Ran et al: "An Adaptive Deep Learning Framework for Shipping Container Code Localization and Recognition", IEEE Transactions On Instrumentation and Measurement, IEEE, USA, vol. 70,Aug. 13, 2020 (Aug. 13, 2020), pp. 1-13.
Koo Kyung-Mo et al: "A Novel Container ISO-Code Recognition Method using Texture Clustering with a Spatial Structure Window", International Journal of Advanced Science and Technology, vol. 41,Apr. 30, 2012 (Apr. 30, 2012), pp. 83-92.
Anonymous: "ISO 6346:2022—Freight containers—Coding, identification and marking", International Standard, Aug. 2022 (Aug. 2022).
Decision to Grant a Patent from Japan Patent Office (JPO) in Japanese Patent Appl. No. 2022-186039, dated Dec. 5, 2023, together with an English language translation.
Office Action from Japan Patent Office (JPO) in Japanese Patent Appl. No. 2022-186039, dated Oct. 3, 2023, together with an English language translation.

* cited by examiner

FIG. 4

| ATTRIBUTE | TRAILER ID | OTHER THAN TRAILER ID |
|---|---|---|
| WRITING MANNER OF CHARACTERS | ☆VERTICAL WRITING<br>SAME SIZE, EQUAL INTERVALS, SINGLE COLOR, AND GOTHIC FONT<br>CHARACTERS ARE WRITTEN IN RECTANGLE<br>SIZE LARGER THAN PREDETERMINED SIZE<br>PREDETERMINED MAGNIFICATION WITH RESPECT TO TRAILER | DECORATIVE FONT<br>ITALIC |
| POSITION OF CHARACTER STRING | IN TRAILER<br>ABOVE LICENSE PLATE<br>WRITING IN VERTICAL WRITING IN CORNER OF TRAILER | WRITING IN TRACTOR<br>ABOVE OR BELOW COMPANY LOGO |
| CONTENT INDICATED BY CHARACTER STRING | INCLUDING ONLY CAPITAL LETTERS AND NUMBERS<br>NUMBER OF CHARACTERS IS WITHIN PREDETERMINED RANGE<br>SPECIFIC RULE FOR EACH COMPANY | ☆CONTAINER ID<br>◎CHARACTERS INDICATING HEIGHT OF TRAILER<br>◎GENERIC NAME<br>◯COMPANY NAME<br>◯TELEPHONE NUMBER<br>◯LICENSE PLATE<br>◯TIME STAMP |

CHARACTER RECOGNITION DEVICE AND CHARACTER RECOGNITION METHOD

CROSS REFERENCE TO RELATED APPLICATIONS

This is a continuation of U.S. patent application Ser. No. 18/511,203, filed Nov. 16, 2023, which claims the benefit of Jap. Pat. Appl. No. 2022-186039, filed Nov. 21, 2022. The entire disclosure of each of the above-identified documents is incorporated herein by reference in its entirety.

TECHNICAL FIELD

The present disclosure relates to a character recognition device and a character recognition method.

BACKGROUND ART

Patent Literature 1 discloses a license plate recognition device that detects a plurality of quadrangles of license plate region candidates from an input image and performs character recognition of character regions included in the license plate region candidates. The license plate recognition device selects a license plate region candidate to be output from the plurality of detected license plate region candidates, based on character recognition results and information on the quadrangles of the license plate region candidates. The license plate recognition device outputs information on the selected license plate region candidate.

CITATION LIST

Patent Literature

Patent Literature 1: JP2008-217347A

SUMMARY OF INVENTION

In recent years, a physical distribution using a trailer has flourished, and there is an increasing need to efficiently manage a location of each trailer. Here, the trailer means a towed vehicle towed by a towing vehicle (also referred to as a tractor). In general, since an identification (ID) related to the identification of a trailer is written on the trailer, it is considered that the trailer can be efficiently managed by recognizing this ID from a captured image of a vehicle or the like. However, the captured image may include various characters, and a character string successfully recognized is not necessarily the ID related to the identification of the trailer. Therefore, when a trailer or the like which is an object to be imaged includes a plurality of character strings of various sizes, colors, and designs, there is a need to detect an ID related to the identification of a trailer from the plurality of character strings and identify the object to be imaged. Hereinafter, the ID related to the identification of the trailer is referred to as a trailer ID.

In Patent Literature 1, a quadrangle that satisfies a predetermined condition is determined as the quadrangle of the license plate region candidate. However, since no unified standard is defined for the trailer ID at present, a position, a size, the number of characters, or the like are not defined. Therefore, even if the same technique as in Patent Literature 1 is applied, it is difficult to detect the trailer ID from various character strings written at any positions of the object to be imaged.

The present disclosure has been made in view of the above-described situation in the related art, and an object thereof is to detect a character string considered to be a trailer ID from a plurality of character strings.

The present disclosure provides a character recognition device including a recognizer that recognizes at least one character string from an image including a trailer captured by an imaging device; an attribute determinator that determines an attribute of the character string recognized by the recognition unit; and a trailer ID estimator that estimates whether the character string is a trailer ID based on the attribute of the character string determined by the attribute determinator.

Further, the present disclosure provides a character recognition method including recognizing at least one character string from an image including a trailer captured by an imaging device, determining an attribute of the recognized character string, and estimating whether the character string is a trailer ID based on the attribute of the character string.

These comprehensive or specific aspects may be implemented by a system, a device, a method, an integrated circuit, a computer program, a recording medium, or any combination of the system, the device, the method, the integrated circuit, the computer program, and the recording medium.

According to the present disclosure, a character string considered to be a trailer ID can be detected from a plurality of character strings.

BRIEF DESCRIPTION OF DRAWINGS

FIG. 4 is a diagram showing attributes for estimation as a trailer ID and attributes for estimation not as the trailer ID.

DESCRIPTION OF EMBODIMENTS

Hereinafter, embodiments that specifically disclose a character recognition device and a character recognition method according to the present disclosure will be described in detail with reference to the drawings as appropriate. However, the unnecessarily detailed description may be omitted. For example, the detailed description of already well-known matters and the repeated description of substantially the same configuration may be omitted. This is to avoid unnecessary redundancy of the following descriptions and to facilitate understanding of those skilled in the art. The accompanying drawings and the following description are provided for those skilled in the art to fully understand the present disclosure, and are not intended to limit the subject matter described in the claims.

Figure 1:
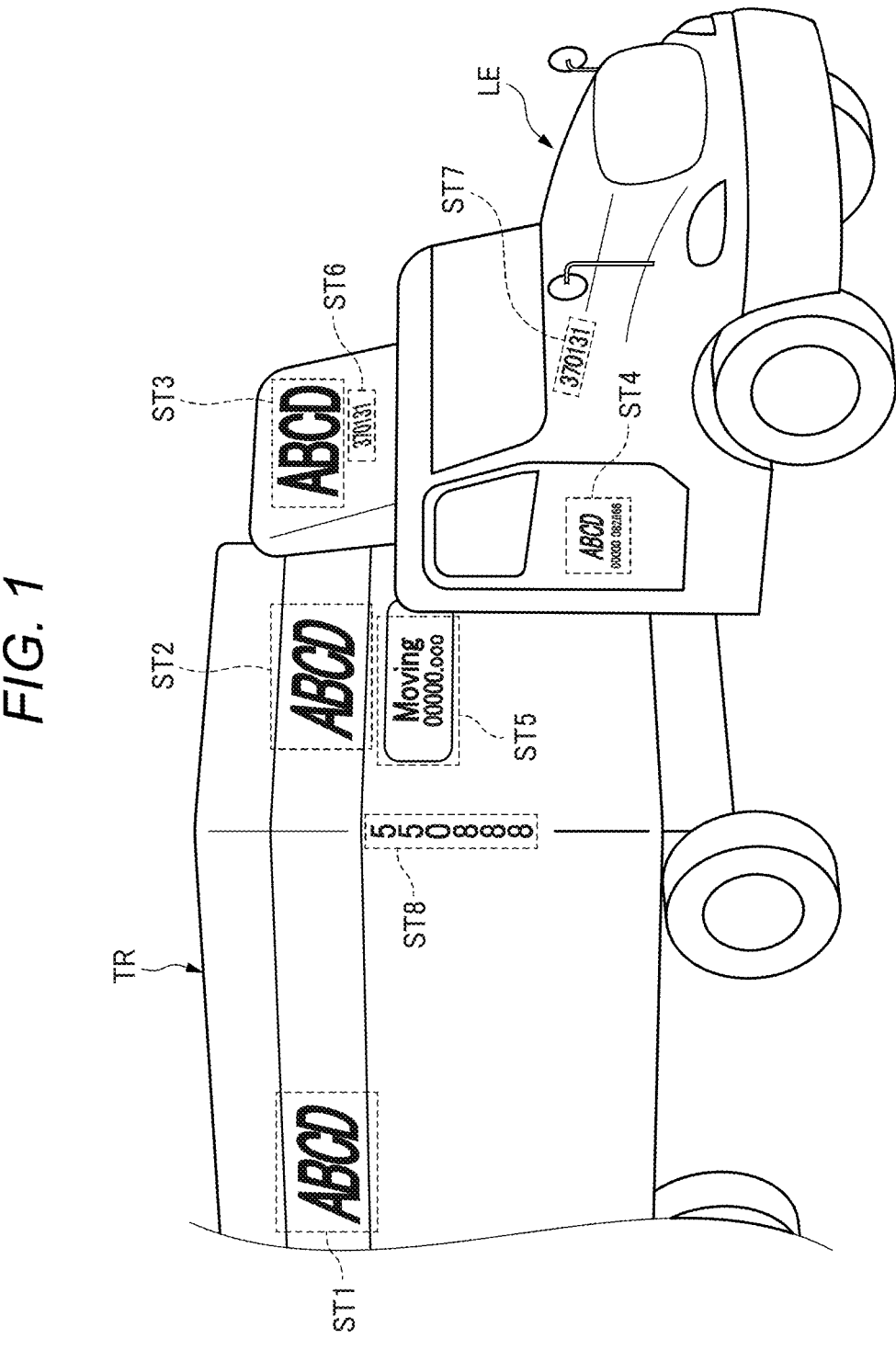
FIG. 1 is a diagram showing character strings written on a trailer.

Character strings written on a trailer will be described with reference to FIG. 1. FIG. 1 is a diagram showing the character strings written on the trailer.

A trailer TR is vehicle of a cargo part towed by a tractor LE. On the trailer TR, is a trailer ID, and character strings related to a company name, a telephone number, a number indicating a height of the trailer, a uniform resource locator (URL), a word, a text, or the like are written. The character strings written on the trailer TR are not limited to the above-described examples.

Character strings ST1, ST2, ST3, and ST4 are character strings indicating a company name. The character strings ST1, ST2, ST3, and ST4 are the character strings subjected to italic character decoration.

A character string ST5 is a character string indicated by an English word and is written below the character string ST2 indicating the company name.

Character strings ST6 and ST7 are character strings related to numbers for identifying the tractor LE.

A character string ST8 is a character string indicating the trailer ID. The character string ST8 is written in vertical writing in a corner of the trailer TR (that is, a boundary portion of surfaces of the trailer TR forming a housing, and a portion which is located on a side surface of the trailer TR and is elongated in a gravity direction).

Thus, the plurality of character strings are written on the trailer TR.

In recent years, as a physical distribution industry has flourished, there is an increasing need to efficiently manage a large number of trailers TR. For example, it is necessary to identify the trailers TR at a place (for example, a departure point, a transit point, and a destination point) in which the plurality of trailers TR gather. However, since the trailer TR has the plurality of character strings (for example, character strings ST1, ST2, ST5, and ST8), there is a problem that it is difficult to detect the trailer ID from the plurality of character strings.

Figure 2:
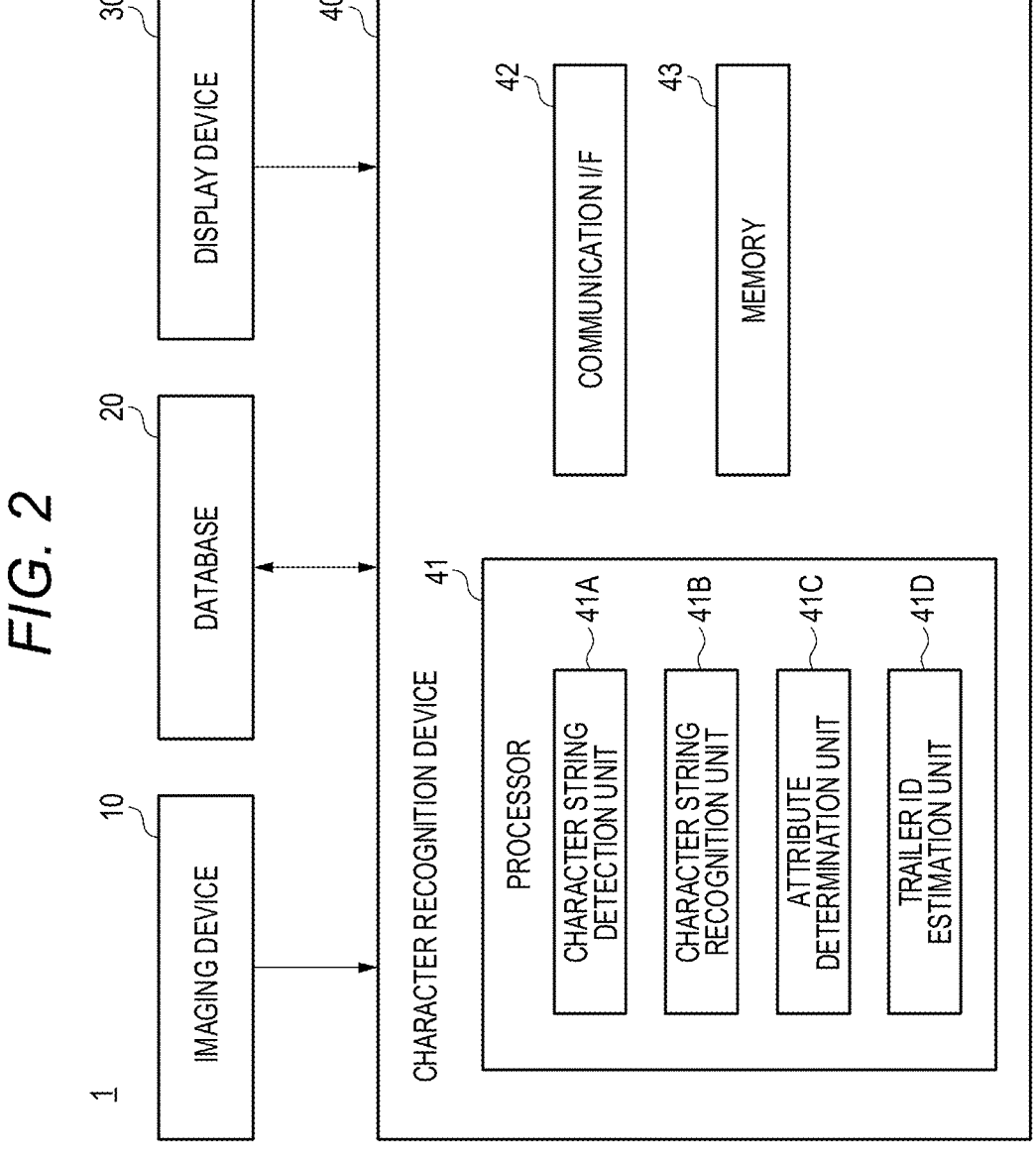
FIG. 2 is a block diagram of a character recognition device according to the present embodiment.

Next, a block diagram of a character recognition device 40 according to the present embodiment will be described with reference to FIG. 2. FIG. 2 is a block diagram of the character recognition device 40 according to the present embodiment.

A character recognition system 1 includes at least an imaging device 10, a database 20, a display device 30, and the character recognition device 40.

The imaging device 10 is a device that captures an image of a trailer. The imaging device 10 includes at least a lens (not shown) as an optical element and an image sensor (not shown). The lens receives light reflected from an object within an angle of view of a region imaged by the imaging device 10 to form an optical image of the object on a light receiving surface (in other words, an imaging surface) of the image sensor. The image sensor is, for example, a solid-state imaging element such as a charged coupled device (CCD) or a complementary metal oxide semiconductor (CMOS). The image sensor converts the optical image formed on the imaging surface via the lens into an electric signal every predetermined time (for example, 1/30 (second)). For example, when the predetermined time is 1/30 (second), a frame rate of the imaging device 10 is 30 fps. In addition, the imaging device 10 may generate image data (video data) by performing a predetermined signal processing on the electric signal every predetermined time described above. The imaging device 10 outputs the image data (video data) to the character recognition device 40. Hereinafter, the image data and the video data are referred to as imaging data.

The database 20 is implemented by a storage medium (for example, a flash memory, a hard disk drive (HDD), and a solid state drive (SSD)). The database 20 stores a table (hereinafter, referred to as a classification table, see FIG. 4) for classifying whether an attribute of a character string is for estimation as a trailer ID. In addition, the database 20 is recorded with a result of determination as to whether a character string is a trailer ID performed by the character recognition device 40. The database 20 may be incorporated in the character recognition device 40.

The display device 30 displays the result of determination as to whether the character string is the trailer ID performed by the character recognition device 40. The display device 30 is, for example, a touch panel display, a display, or a mobile phone. The display device 30 may be integrated with the character recognition device 40.

The character recognition device 40 includes at least a processor 41, a communication I/F 42, and a memory 43. The character recognition device 40 is, for example, a personal computer (PC).

The processor 41 is, for example, a central processing unit (CPU), a digital signal 10 processor (DSP), a graphical processing unit (GPU), or a field programmable gate array (FPGA). The processor 41 functions as a controller that controls the overall operation of the character recognition device 40. The processor 41 performs a control processing for controlling an operation of each unit of the character recognition device 40, an input and output processing of data between each unit of the character recognition device 40, a data calculation processing, and a data storage processing. The processor 41 operates according to a program stored in the memory 43. The processor 41 uses the memory 43 during operation, and temporarily stores data generated or acquired by the processor 41 in the memory 43. The processor 41 implements respective functions of a character string detection unit 41A, a character string recognition unit 41B, an attribute determination unit 41C, and a trailer ID estimation unit 41D by using the program and the data stored in the memory 43.

The character string detection unit 41A as an example of a detection unit detects character strings from the imaging data acquired from the imaging device 10. The character string detection unit 41A detects a character string using a known technique such as machine learning.

The character string recognition unit 41B as an example of a recognition unit performs character recognition of the character strings detected by the character string detection unit 41A. The character string recognition unit 41B performs the character recognition of the character strings using a known technique such as optical character recognition (OCR).

The attribute determination unit 41C as an example of a determination unit determines an attribute of each character string recognized by the character string detection unit 41A. The attribute is, for example, a writing manner of a character, a position of a character string, or a content indicated by the character string. The attribute will be described later.

The trailer ID estimation unit 41D as an example of a determination unit estimates whether the detected and recognized character string is a trailer ID based on the attribute. The trailer ID estimation unit 41D calculates, as a score, a level of a possibility that the character string is the trailer ID based on the attribute. The trailer ID estimation unit 41D classifies the character strings into one estimated to be a trailer ID, one estimated not to be the trailer ID, one having a high possibility of being the trailer ID based on the calculated score, and one having a low possibility of being the trailer ID based on the calculated score. The trailer ID estimation unit 41D sorts (that is, rearranges) the classified character strings in an order (for example, a descending order of score) in which a possibility of being the trailer ID is considered to be high. The trailer ID estimation unit 41D outputs an estimation result, and a classification result or a sorting result of the character strings to the communication I/F 42.

The communication OF 42 is an interface circuit that performs wireless or wired communication between the character recognition device 40 and the imaging device 10, between the character recognition device 40 and the database 20, and between the character recognition device 40 and the display device 30. Here, OF represents an interface. The communication between the character recognition device 40 and the imaging device 10, between the character recognition device 40 and the database 20, and between the character recognition device 40 and the display device 30 may be performed via a network. Examples of a communication method performed by the communication OF 42 include mobile communication such as a wide area network (WAN), a local area network (LAN), a long term evolution (LTE), and 5G, power line communication, short-range wireless communication (for example, Bluetooth (registered trademark) communication), and communication for a mobile phone.

The memory 43 includes, for example, a random access memory (RAM) and a ROM, and temporarily holds a program necessary for the operation of the character recognition device 40 and data generated during the operation. The RAM is, for example, a work memory used during the operation of the character recognition device 40. The ROM stores and holds in advance, for example, a program for controlling the character recognition device 40.

Figure 3:
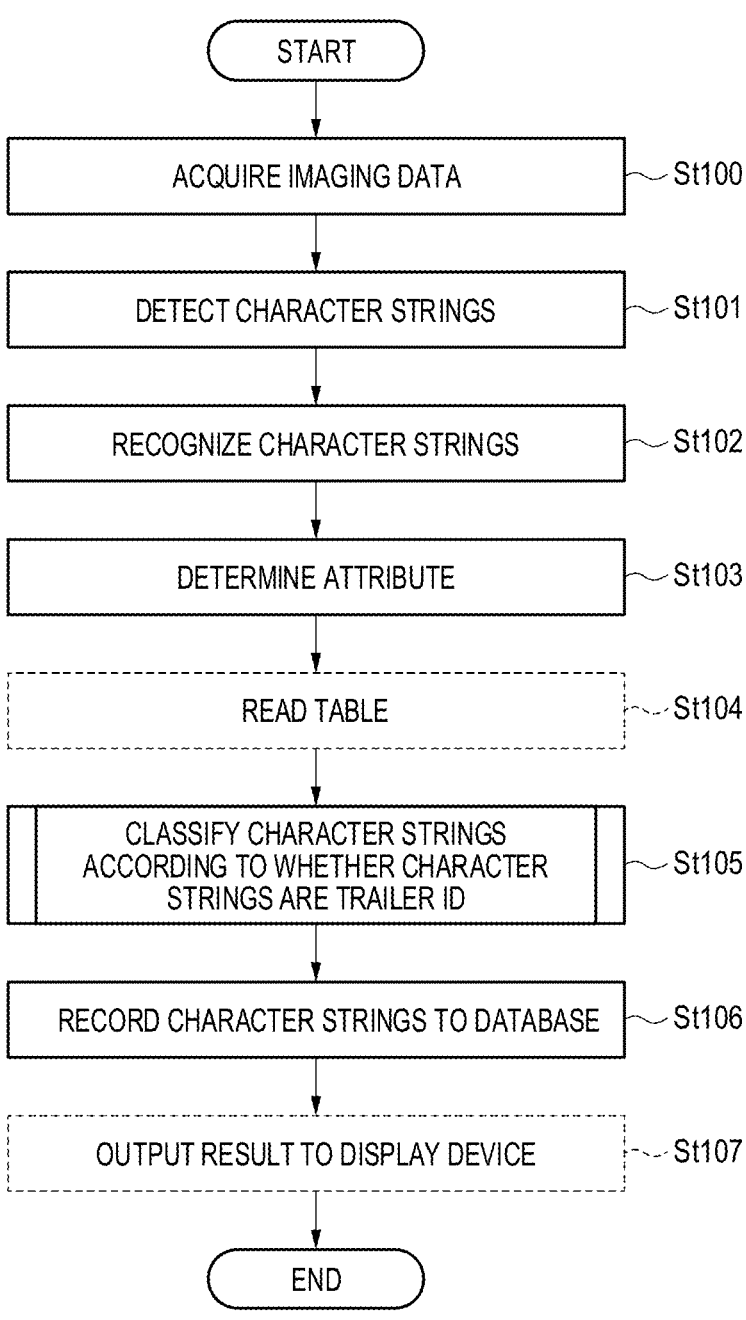
FIG. 3 is a flowchart of processing executed by a character recognition device.

Next, a flowchart of processing executed by the character recognition device 40 will be described with reference to FIG. 3. FIG. 3 is a flowchart of the processing executed by the character recognition device 40. Each processing of the flowchart according to FIG. 3 is executed by the processor 41.

The processor 41 acquires the imaging data from the imaging device 10 (step St100).

The processor 41 detects character strings from the imaging data acquired in the processing of step St100 (step St101).

The processor 41 performs character recognition of the character strings detected in the processing of step St101 (step St102).

The processor 41 determines an attribute of each character string recognized in the processing of step St102 (step St103).

The processor 41 reads the classification table stored in the database 20 (step St104). The processing of step St104 may be omitted.

The processor 41 estimates whether the character string is a trailer ID based on the attribute determined in the processing of step St103. The processor 41 estimates whether each of the plurality of character strings detected in the processing of step St101 is the trailer ID, and classifies the character strings into a character string estimated to be the trailer ID and a character string estimated not to be the trailer ID (step St105). The processing of step St105 will be described in detail with reference to FIG. 5.

The processor 41 outputs and records the character strings classified in the processing of step St105 to the database 20 (step St106).

The processor 41 outputs a result of step St105 to the display device 30 (step St107). The processing of step St107 may be omitted.

Next, attributes for estimation as a trailer ID and attributes for estimation not as the trailer ID will be described with reference to FIG. 4. FIG. 4 is a diagram showing the attributes for estimation as the trailer ID and the attributes for estimation not as the trailer ID.

The classification table shown in FIG. 4 is a table for classifying whether each attribute is the attribute for estimation as the trailer ID or the attribute for estimation not as the trailer ID.

A description will be given of whether each attribute related to a "writing manner of characters" is for estimation as the trailer ID or not as the trailer ID.

The expression that a character string is written in vertical writing is one of the attributes for estimation as the trailer ID. In general, there is a low possibility that information such as a company name, a telephone number, and a URL is written in vertical writing, and characters on a license plate are also regulated to be written in horizontal writing. Therefore, there is a low possibility that characters other than the trailer ID are written in vertical writing.

The expression that characters included in a character string have the same size, equal intervals, a single color, or gothic font is one of the attributes for estimating that the character string is the trailer ID. Since the trailer ID is less likely to be used for an advertising purpose due to a nature thereof, a special design or the like is less likely to be adopted in the trailer ID, and the trailer ID is often written in a simple form. Therefore, the expression that the character string is written in a simple form as described above may be a basis for estimating that the character string is the trailer ID.

The expression that a character string is written in a rectangle is one of the attributes for estimation as the trailer ID. When a color of the trailer and a color of the trailer ID are similar to each other, a measure may be taken to improve visibility. Such a measure may include drawing a rectangle of another color as a background of the trailer ID. Other measures such as edging of characters are conceivable, but the measures are less likely to be adopted for the trailer ID, because, for the trailer ID, the visibility is more important than the design. Therefore, the expression that a character string is written in a rectangle may be a basis for estimating that the character string is the trailer ID.

The expression that a character string has a size larger than a predetermined size determined in advance by a user (for example, a person who manages the character recognition device 40) is one of the attributes for estimation as the trailer ID. This is because the trailer ID is often written in a large size with an emphasis on visibility.

The expression that a character string has a predetermined magnification with respect to the trailer is one of the attributes for estimation as the trailer ID. This is because the trailer ID is often written in a large size with an emphasis on visibility.

The expression that a character string is of a decorative font or an italic font is one of the attributes for estimation not as the trailer ID. This is because the trailer ID is a character string written to make the ID itself visually recognizable, and thus it is not necessary to make a typeface or the like more complicated than necessary.

Next, a description will be given of whether each attribute related to a "position of a character string" is for estimation as the trailer ID or not as the trailer ID.

The expression that a character string is located above the license plate is one of the attributes for estimation as the trailer ID. This is because the trailer ID is less likely to be written at a position lower than the license plate, which is generally disposed at a lower portion of a vehicle body. Since various methods for detecting a position of the license plate are known, the details thereof are omitted.

The expression that a character string is written in vertical writing at a corner of the trailer is one of the attributes for estimation as the trailer ID. Since the corner of the trailer is a place that is less likely to be visually recognized unless a person is conscious of the corner, it is less likely to select the corner of the trailer as a position to write information to be publicly disclosed, such as a company name or a telephone number. Therefore, there is a high possibility that the character string written at this place is a character string used for a special purpose by an operator, such as the trailer ID. As described above, there is a high possibility that the character string written in vertical writing is the trailer ID. In the present embodiment, writing the character string in vertical writing at the corner is an example of the attributes, but the expression that the character string is written at the corner regardless of a direction of the character string may be used as the attribute for estimation as the trailer ID. This is because the writing at the corner itself suggests that the character string is for a special purpose as described above.

The expression that a character string is written on the tractor LE is one of the attributes for estimation not as the trailer ID. This is because the trailer can be moved by replacing the tractor, and thus there is a low possibility that the trailer ID, which is a character string for identifying the trailer, is written on the tractor.

The expression that a character string is written above or below a company logo, a mark, or a character string is one of the attributes for estimation not as the trailer ID. This is because a character string written around the company logo or the like is highly likely to be information to be publicly disclosed, such as a telephone number or an advertisement phrase, and is less likely to be written as information for the operator, such as the trailer ID.

Next, a description will be given of whether each attribute related to a "content indicated by a character string" is for estimation as the trailer ID or not as the trailer ID.

The expression that a character string includes only capital letters and numbers is one of the attributes for estimation as the trailer ID. This is because when a character string that includes easily confused characters such as capital letters and small letters is used as an ID, a plurality of different IDs having the same pronunciation are present, which causes confusion, and thus it is general to limit a type of characters used as an ID. The capital letters are often adopted from the viewpoint of visibility between the capital letters and the small letters, and the numbers are also generally used in combination in order to generate more IDs, and thus the expression that the character string includes only the capital letters and the numbers may be a basis for estimation as the trailer ID. In the present embodiment, the expression that the character string includes only the capital letters and the numbers is one of the attributes for estimation as the trailer ID, but when it is known that a character string including only one type of capital letters, small letters, or numbers tends to be used as the trailer ID, the expression that the character string is formed of the character type may be one of the attributes for estimation as the trailer ID. In addition, the expression that a character string does not include a character type used only in some limited languages, such as Chinese characters and Hangul, may be one of the attributes for estimation as the trailer ID. This is because there is a low possibility that characters that can be read only in a limited number of languages are used as a trailer ID particularly when global transportation is performed.

The expression that the number of characters is within a predetermined range defined in advance by the user is one of the attributes for estimation as the trailer ID. This is because the number of characters constituting the trailer ID is often the limited number of characters unlike a sentence or the like.

The expression that a character string conforms to a specific rule for each company is one of the attributes for estimation as the trailer ID. This is because when a rule for each company is known, there is a high possibility that a character string matching the rule is the trailer ID.

The expression that a character string is a container ID is one of the attributes for estimation not as the trailer ID. The container ID is a code that is written according to a predetermined specification and is used for managing and identifying a container. In the present embodiment, the container ID is assumed to be an international standard code defined by ISO6346. The container ID is an ID used for managing a container, and is a character string in which a unified standard is regulated between operators. When a trailer ID that matches this standard is adopted as a trailer ID used by those skilled in the art, there is a problem in management of containers between the operators, and thus there is a low possibility that a form that matches the container ID standard is adopted as a form of the trailer ID. Therefore, the expression that the character string is the container ID may be a basis for estimation not as the trailer ID.

The expression that a character string indicates a height of the trailer is one of the attributes for estimation not as the trailer ID. Whether the character string indicates the height of the trailer can be determined based on the presence or absence of characters indicating a unit, the number of digits of a numerical value, and the like. In addition, when there is a possibility that a character string or the like indicating a height of one other than the trailer (for example, a height of the tractor) is written, the expression that the character string indicates the height of the tractor may be used as the attribute for estimation not as the trailer ID.

The expression that a character string is a generic name is one of the attributes for estimation not as the trailer ID. This is because the trailer ID is often constituted as a meaningless character string in order to prevent confusion with other character strings.

The expression that a character string is a company name is one of the attributes for estimation not as the trailer ID. This is because the trailer ID is often constituted as a meaningless character string in order to prevent confusion with other character strings. Whether the character string is the company name can be estimated by, for example, comparing the recognized character string with a database of company names. In order to ensure a uniqueness of the trailer ID, a company name may be included as a part of the trailer ID. Therefore, when it is known that the trailer ID including the company name can be imaged, the expression that the character string is the company name may be excluded from the attributes for estimation not as the trailer ID.

The expression that a character string is a telephone number is one of the attributes for estimation not as the trailer ID. Whether the character string is the telephone number can be estimated by comparing the number of digits of the recognized character string, a format such as the presence or absence of a hyphen, or a content of the character string with a database of telephone numbers.

The expression that a character string is a license plate is one of the attributes for estimation not as the trailer ID. This is because a character string that may be written on a license plate is often regulated by law or the like, and there is a low possibility that the trailer ID is written on the license plate.

The expression that a character string is a time stamp related to a date and time or the like written in imaging data is one of the attributes for estimation not as the trailer ID.

The attributes each marked with a star mark shown in FIG. 4 (the expression that the character string is written in vertical writing, and the expression that the character string is the container ID) are attributes that are preferentially judged over the other attributes when it is estimated whether a character string is the trailer ID. The attributes to be preferentially judged may be attributes having a higher possibility of identifying the trailer ID with high probability than the other attributes or a combination of the attributes. In the present embodiment, the reason for using the expression that the character string is written in vertical writing and the expression that the character string is the container ID as the attributes to be preferentially judged is as follows. First, a character string written on a container is often written in horizontal writing, and there is a low possibility that a character string written in vertical writing is a character string indicating a company name or the like. Therefore, a character string having a low possibility of being a trailer ID can be excluded by selecting the character string written in vertical writing. However, since it is known that the container ID may be written in vertical writing, the container ID may not be completely excluded only by selecting the character strings written in vertical writing. However, since the container ID needs to be written in a form defined in the standard, it is possible to reliably determine whether the character string is the container ID based on whether the character string matches the form. That is, a character string which is written in vertical writing and is not the container ID can be estimated to be the trailer ID with high probability.

The attributes each marked with a double circle shown in FIG. 4 (the expression that the character string indicates the height of the trailer, and the expression that the character string is the generic name, the company name, the telephone number, the license plate, or the time stamp) are attributes for determination not as the trailer ID when the character string matches one of the attributes.

Figure 5:
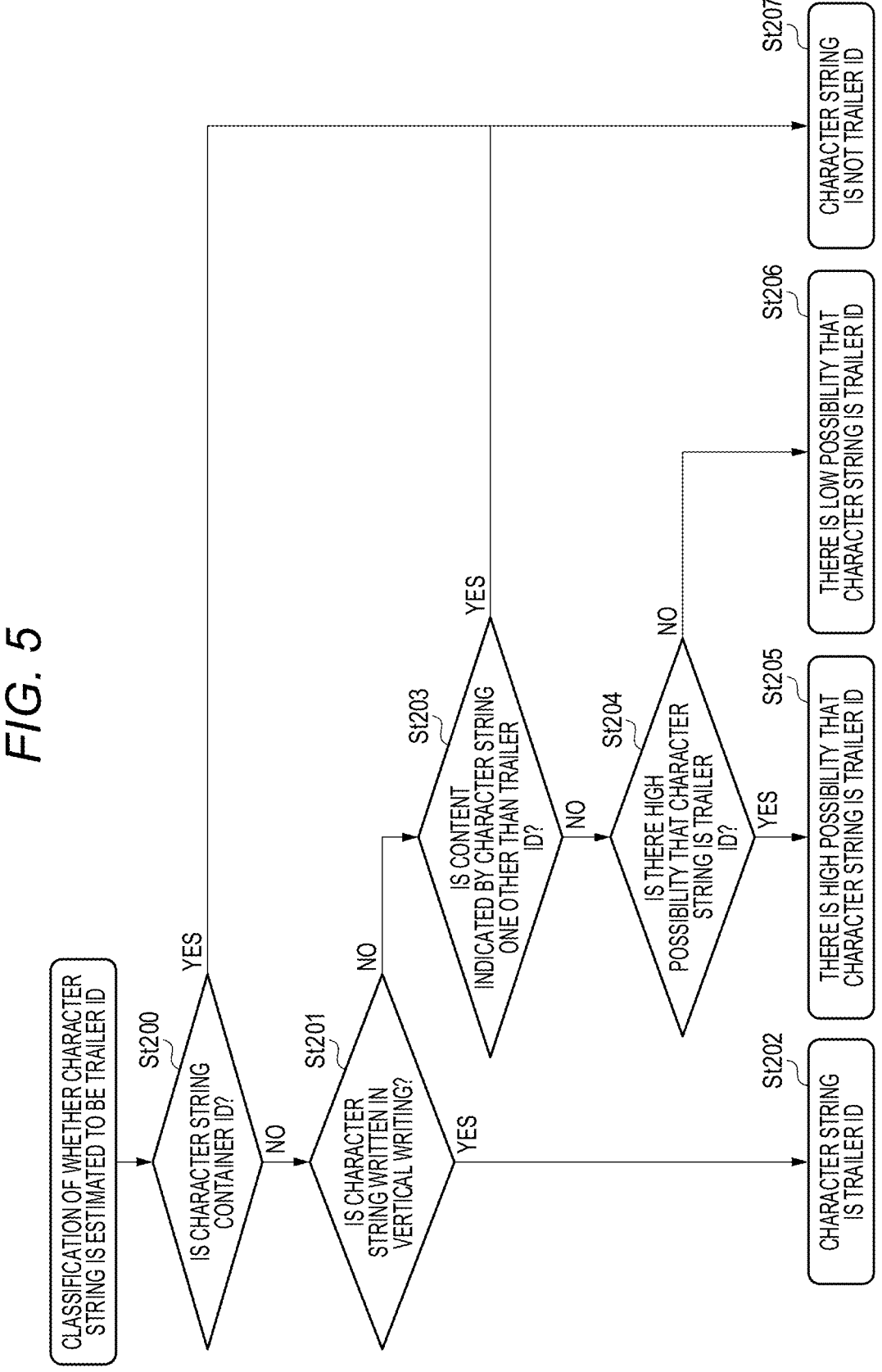
FIG. 5 is a flowchart of a classification of whether a character string is estimated to be a trailer ID.

Next, processing of the classification of whether a character string is estimated to be a trailer ID will be described with reference to FIG. 5. FIG. 5 is a flowchart of the classification of whether the character string is estimated to be the trailer ID. Each processing according to the flowchart of FIG. 5 is executed by the processor 41.

The processor 41 determines whether a character string is a container ID (step St200). When it is determined that the character string is the container ID (step St200, YES), the processor 41 determines that the character string is not a trailer ID (step St207).

When it is determined that the character string is not the container ID (step St200, NO), the processor 41 determines whether the character string is written in vertical writing (step St201).

When it is determined that the character string is written in vertical writing (step St201, YES), the processor 41 determines that the character string is the trailer ID (step St202).

When it is determined that the character string is not written in vertical writing (step St201, NO), the processor 41 determines whether a content indicated by the character string is one other than the trailer ID (step St203). That is, in the processing of step St203, the processor 41 determines whether the character string corresponds to the attribute each marked with a double circle in the table of FIG. 4.

When it is determined that the character string corresponds to one of the attributes each marked with a double circle in the table of FIG. 4 (that is, the character string is one other than the trailer ID) (step St203, YES), the processor 41 determines that the character string is not the trailer ID (step St207).

When it is determined that the character string does not correspond to one of the attributes each marked with a double circle in the table of FIG. 4 (that is, the character string is not one other than the trailer ID) (step St203, NO), the processor 41 determines whether there is a high possibility that the character string is the trailer ID using the other attributes (hereinafter, referred to as normal attributes) to which no symbol is marked in the table of FIG. 4 (step St204). The processor 41 calculates, for example, a level of the possibility that the character string is the trailer ID as a score. For example, the processor 41 adds the score when a character string corresponds to the normal attribute for estimation as the trailer ID, and subtracts the score when a character string corresponds to the normal attribute for estimation not as the trailer ID. A method of calculating a score is not limited to the above-described example, and the score may be calculated by combining addition, subtraction, and multiplication. The higher the score, the higher the possibility that the character string is the trailer ID. The processor 41 may sort character strings based on calculated scores (for example, arrange the character strings in a descending order of score).

When it is determined by using the normal attributes that there is a high possibility that the character string is the trailer ID (step St204, YES), the processor 41 classifies the character string into a character string having a high possibility of being the trailer ID (step St205). For example, when the calculated score is equal to or greater than a predetermined threshold value, the processor 41 determines that there is a high possibility that the character string is the trailer ID. In addition, the processor 41 may sort character strings determined to have a high possibility of being the trailer ID in order of score (that is, arrange the character strings in a descending order or an ascending order of score).

When it is determined by using the normal attributes that there is a low possibility that the character string is the trailer ID (step St204, NO), the processor 41 classifies the character string into a character string having a low possibility of being the trailer ID (step St206). For example, when the calculated score is less than the predetermined threshold value, the processor 41 determines that there is a low possibility that the character string is the trailer ID. In addition, the processor 41 may sort character strings determined to have a low possibility of being the trailer ID in order of score (that is, arrange the character strings in the descending order or the ascending order of score).

(Other Modifications)

The attributes for estimation as the trailer ID and the attributes for estimation not as the trailer ID in the above-described embodiment are examples, and the attributes for estimation as the trailer ID and the attributes for estimation not as the trailer ID may be adopted based on other conditions. In addition, the attributes for estimation as the trailer ID and the attributes for estimation not as the trailer ID may be reversed and used as attributes having equivalent meanings. For example, instead of using the expression that the character string is written in vertical writing as the attribute for estimation as the trailer ID, the expression that a character string is written in horizontal writing may be used as the attribute for estimation not as the trailer ID.

In the above-described embodiment, the expression that the character string is written in vertical writing and the expression that the character string is the container ID are exemplified as the attributes that are preferentially determined over the other attributes. However, any one attribute or the other attributes may be used as the attributes to be preferentially judged. As described above, when the character string is written in vertical writing and the character string is not the container ID, it can be said that the character string is the trailer ID with high probability. However, for example, when it is known that a character string written in vertical writing does not include the container ID, only the expression that the character string is written in vertical writing may be the attribute to be preferentially judged. In addition, for example, when it is known that the trailer ID is written in a special form, it is possible to recognize the trailer ID more efficiently by using the attributes as the attribute to be preferentially judged.

(Summary of Present Disclosure)

The following techniques are disclosed by the above-described description of the embodiments.

<Technique 1>

A character recognition device (for example, character recognition device 40) according to the present embodiment includes: a recognition unit (for example, character string recognition unit 41B) configured to recognize at least one character string from an image including a trailer captured by an imaging device (for example, imaging device 10); an attribute determination unit (for example, attribute determination unit 41C) configured to determine an attribute of the character string recognized by the recognition unit; and a trailer ID estimation unit (for example, trailer ID estimation unit 41D) configured to estimate whether the character string is a trailer ID based on the attribute of the character string determined by the attribute determination unit.

Accordingly, when a plurality of character strings are written at any positions in various sizes, fonts, or writing manners in the trailer, the character recognition device according to the present embodiment can detect a character string considered to be the trailer ID from the plurality of character strings. That is, the character recognition device can detect the trailer ID from the plurality of character strings written on the trailer with high accuracy.

<Technique 2>

In the character recognition device according to Technique 1, the trailer ID estimation unit estimates that the character string is the trailer ID when a writing manner of the character string is vertical writing and a content indicated by the character string is not a container ID according to a predetermined specification.

Accordingly, the character recognition device according to the present embodiment can reliably determine whether the character string is the container ID based on whether the character string matches a form defined by a predetermined standard. When the container ID is written in vertical writing, the character recognition device can estimate that the character string is not the trailer ID with high probability. That is, the character recognition device can exclude the container ID from the plurality of character strings with high probability and detect the character string considered to be the trailer ID with high accuracy.

<Technique 3>

In the character recognition device according to Technique 1 or 2, the trailer ID estimation unit estimates that the character string is the trailer ID when the writing manner of the character string is vertical writing and the content indicated by the character string is not a container ID specified by ISO6346.

Accordingly, the character recognition device according to the present embodiment can exclude the container ID from the plurality of character strings and detect the character string considered to be the trailer ID with high accuracy.

<Technique 4>

In the character recognition device according to any one of Techniques 1 to 3, the trailer ID estimation unit estimates that the character string is not the trailer ID when the writing manner of the character string is not vertical writing, and the content indicated by the character string is not the container ID and is one other than the trailer ID.

Accordingly, the character recognition device according to the present embodiment can exclude any character string that is written in horizontal writing and is not the container ID when the content indicated by the character string is one other than the trailer ID. That is, the character recognition device can prevent the character string indicating one other than the trailer ID from being erroneously detected as the trailer ID.

<Technique 5>

In the character recognition device according to any one of Techniques 1 to 4, the character string indicating one other than the trailer ID indicates a height of the trailer, a generic name, a company name, a telephone number, a license plate, or a time embedded in the image captured by the imaging device.

Accordingly, the character recognition device according to the present embodiment can prevent the character string indicating one other than the trailer ID from being erroneously detected as the trailer ID.

<Technique 6>

In the character recognition device according to any one of Techniques 1 to 5, the trailer ID estimation unit estimates whether there is a high possibility of being the trailer ID based on at least one of an attribute related to a writing manner of a character, an attribute related to a position of the character string, and an attribute by which the content indicated by the character string is estimated to be the trailer ID, when the writing manner of the character string is not vertical writing, and the content indicated by the character string is not the container ID and is not one other than the trailer ID.

Accordingly, the character recognition device according to the present embodiment can classify the plurality of character strings written on the trailer with high accuracy according to whether there is a high possibility of being the trailer ID.

<Technique 7>

In the character recognition device according to any one of Techniques 1 to 6, the trailer ID estimation unit is configured to calculate, as a score, a level of the possibility that the character string is the trailer ID.

Accordingly, the character recognition device according to the present embodiment can classify the character strings written on the trailer by scoring the character strings according to the level of the possibility of being the trailer ID.

<Technique 8>

In the character recognition device according to any one of Techniques 1 to 7, the trailer ID estimation unit estimates that there is a high possibility that the character string is the trailer ID when all characters have the same size and equal intervals.

Accordingly, the character recognition device according to the present embodiment can extract a character string having a high possibility of being the trailer ID from the plurality of character strings written on the trailer.

<Technique 9>

In the character recognition device according to any one of Techniques 1 to 8, the trailer ID estimation unit estimates that there is a low possibility that the character string is the trailer ID when the character string is subjected to character decoration.

Accordingly, the character recognition device according to the present embodiment can extract and exclude a character string having a low possibility of being the trailer ID from the plurality of character strings written on the trailer.

<Technique 10>

In the character recognition device according to any one of Techniques 1 to 9, the trailer ID estimation unit estimates that there is a high possibility that the character string is the trailer ID when the character string is located above a license plate or in the trailer.

Accordingly, the character recognition device according to the present embodiment can extract a character string having a high possibility of being the trailer ID from the plurality of character strings written on the trailer.

<Technique 11>

In the character recognition device according to any one of Techniques 1 to 10, the trailer ID estimation unit estimates that there is a low possibility that the character string is the trailer ID when the character string is written on a tractor or is written above or below a company logo.

Accordingly, the character recognition device according to the present embodiment can extract and exclude a character string having a low possibility of being the trailer ID from the plurality of character strings written on the trailer.

<Technique 12>

In the character recognition device according to any one of Techniques 1 to 11, the trailer ID estimation unit estimates that there is a high possibility that the character string is the trailer ID when the character string includes only capital letters and numbers, when the number of characters of the character string is equal to or less than a predetermined number of characters, or when the character string conforms to a specific rule for each company.

Accordingly, the character recognition device according to the present embodiment can extract a character string having a high possibility of being the trailer ID from the plurality of character strings written on the trailer.

<Technique 13>

In the character recognition device according to any one of Techniques 1 to 12, the trailer ID estimation unit estimates that the character string is not the trailer ID when the character string is a container ID according to a predetermined specification.

Accordingly, the character recognition device according to the present embodiment can exclude the character strings estimated to be the container ID from the plurality of character strings written on the trailer.

<Technique 14>

In the character recognition device according to any one of Techniques 1 to 13, the attribute is a writing manner of a character, a position of the character string, or a content indicated by the character string.

Accordingly, the character recognition device according to the present embodiment can estimate whether each of the plurality of character strings written on the trailer is the trailer ID based on the attributes. That is, the character recognition device can detect the trailer ID from the plurality of character strings with high accuracy.

<Technique 15>

In the character recognition device according to any one of Techniques 1 to 14, the trailer ID estimation unit is configured to output a determination result to a display device.

Accordingly, the character recognition device according to the present embodiment can support the user who uses the character recognition device to identify the trailer using the trailer ID.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the above-described embodiments may be combined freely in a range without deviating from the spirit of the invention.

INDUSTRIAL APPLICABILITY

The techniques of the present disclosure are useful as a character recognition device and a character recognition method for detecting a character string considered to be a trailer ID from a plurality of character strings.

What is claimed is:

1. A character recognition device, comprising:
   a recognition circuit that recognizes at least one character string from an image, the image including a trailer and being captured by an imaging device; and
   an ID estimation circuit that estimates whether the character string is a trailer ID based on an attribute of the character string,
   wherein the attribute is a writing manner of the character string, and
   the ID estimation circuit estimates a possibility that the character string is the trailer ID is higher when the writing manner of the character string is vertical writing than when the writing manner of the character string is horizontal writing.

2. The character recognition device according to claim 1, wherein the ID estimation circuit estimates that the character string is the trailer ID when the writing manner of the character string is vertical writing and a content indicated by the character string is not a container ID according to a predetermined specification.

3. The character recognition device according to claim 2, wherein
   the container ID is regulated by ISO6346.

4. The character recognition device according to claim 2, wherein
   the ID estimation circuit estimates that the character string is not the trailer ID when the character string is the container ID according to the predetermined specification.

5. The character recognition device according to claim 1, wherein
   the attribute is a position where the character string is written, and
   the ID estimation circuit estimates that the character string is the trailer ID when the character string is written at a corner of the trailer.

6. The character recognition device according to claim 1, wherein the attribute is a type of characters included in the character string, and the ID estimation circuit estimates that a possibility that the character string is the trailer ID is higher when the character string includes both of a character and a number than when the character string includes only the character or only the number.

7. The character recognition device according to claim 1, wherein the attribute is a number of characters in the character string, and the ID estimation circuit estimates that the possibility that the character string is the trailer ID is higher when the number of characters in the character string is within a predetermined range than when the number of characters in the character string is out of the predetermined range.

8. The character recognition device according to claim 1, wherein the ID estimation circuit outputs a determination result to a display device.

9. A character recognition method, comprising:

recognizing at least one character string from an image, the image including a trailer and being captured by an imaging device; and estimating whether the character string is a trailer ID based on an attribute of the character string, wherein the attribute is a writing manner of the character string, and the estimating estimates that a possibility of the character string being the trailer ID is higher when the writing manner of the character string is vertical writing than when the writing manner of the character string is horizontal writing.

* * * * *